J. M. SIMMONS.
WINDOW FOR AUTOMOBILE CURTAINS.
APPLICATION FILED AUG. 14, 1918.
1,341,082.
Patented May 25, 1920.
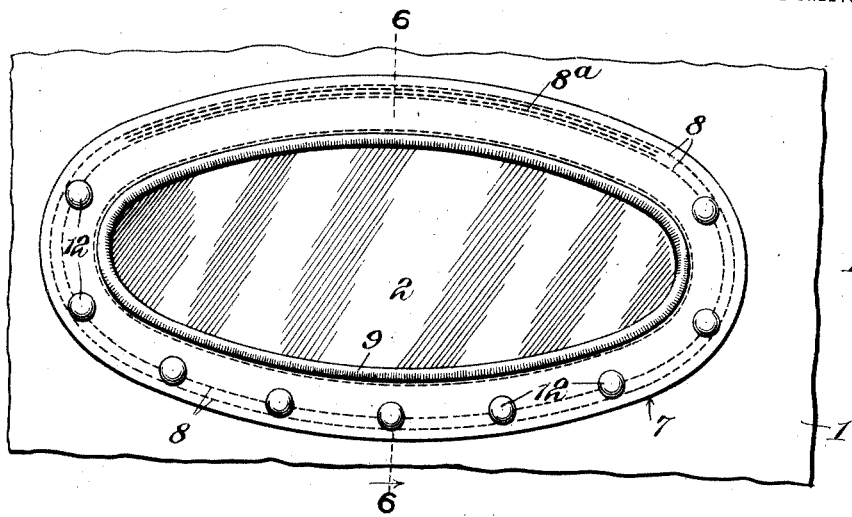
*Fig. 1.*
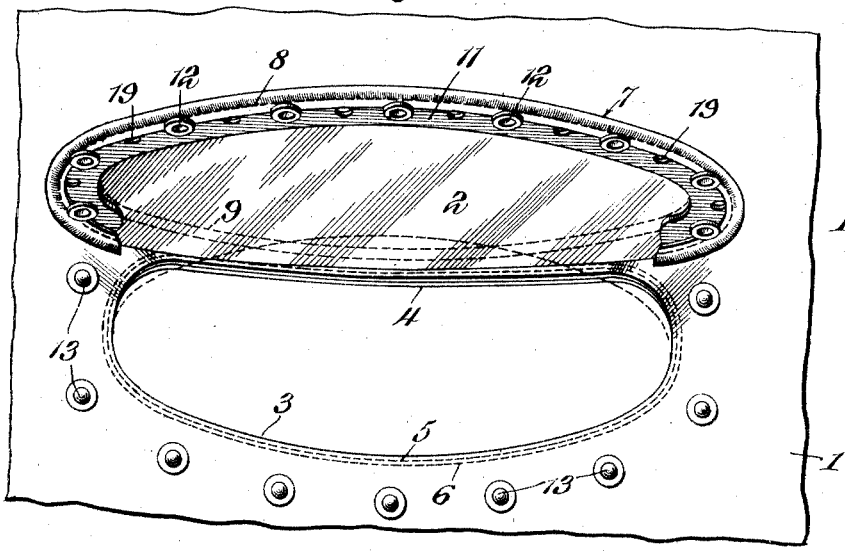
*Fig. 2.*
*Fig. 3.*
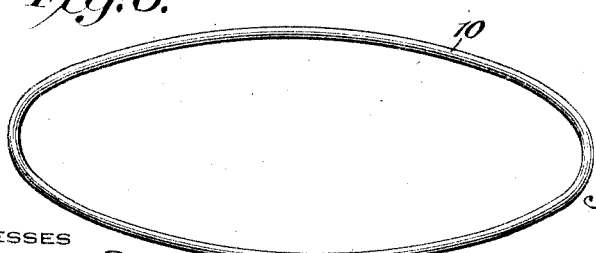
WITNESSES
Howard D. Orr
F. T. Chapman
John M. Simmons,
INVENTOR,
BY
E. G. Siggers
ATTORNEY J. M. SIMMONS.
WINDOW FOR AUTOMOBILE CURTAINS.
APPLICATION FILED AUG. 14, 1918.
1,341,082.
Patented May 25, 1920.
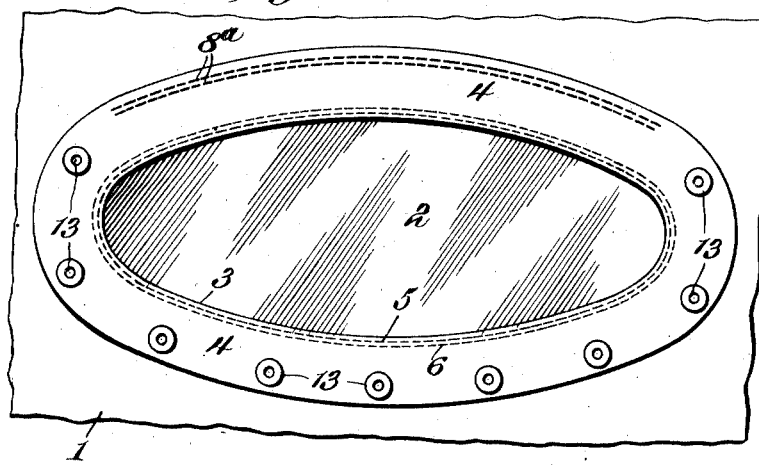
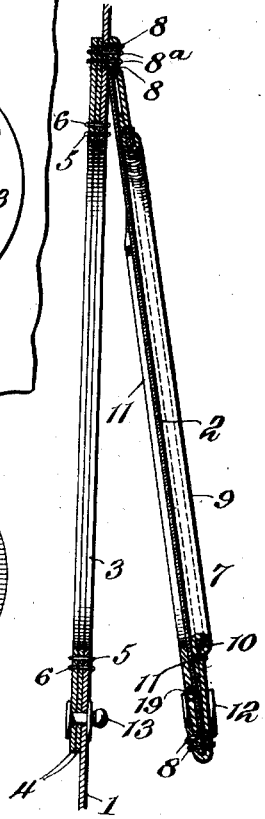
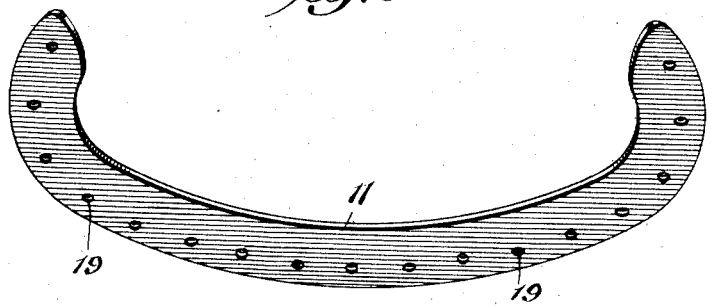
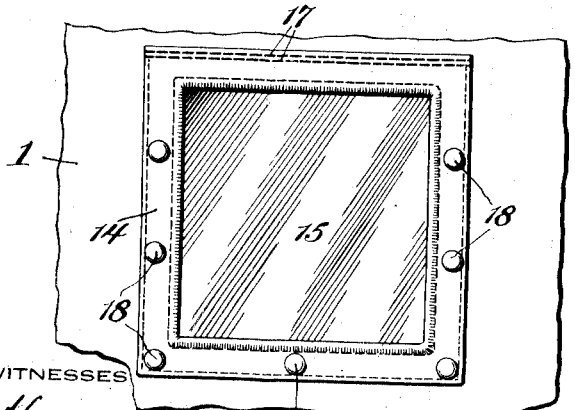
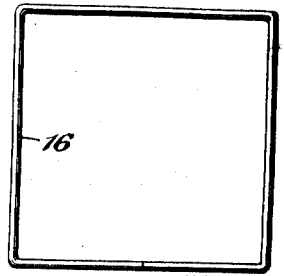
WITNESSES
Howard D. Orr
F. F. Chapman
INVENTOR,
John M. Simmons,
BY
ATTORNEY

UNITED STATES PATENT OFFICE.

JOHN MARTIN SIMMONS, OF BOISE, IDAHO.

WINDOW FOR AUTOMOBILE-CURTAINS.

1,341,082.  Specification of Letters Patent.  Patented May 25, 1920.

Application filed August 14, 1918. Serial No. 249,815.

*To all whom it may concern:*

Be it known that I, JOHN M. SIMMONS, a citizen of the United States, residing at Boise, in the county of Ada and State of Idaho, have invented a new and useful Window for Automobile-Curtains, of which the following is a specification.

This invention has reference to windows for automobile curtains, and its object is to provide a window structure, especially adapted to the back or rear curtain of an automobile whereby the pane, whether of celluloid or glass, may be readily replaced when damaged, or in matter of cleansing may be readily removed without requiring the removal of the curtain.

Usually the rear curtains of automobile tops are not readily removable and when the transparent panes need removal or replacing, especially in the case of breakage, the operation is a tedious and difficult one, and because of this fact it is not uncommon to permit broken panes to remain in the curtain.

By the present invention the pane, or each pane if there be more than one, is held in a pocket in part permanently fast to the curtain and with the remainder of the edge of the pocket made fast to the curtain by readily removable fastening devices, the arrangement being such that the pocket may be opened for the removal or reception of a pane and then fastened in place to hold the pane firmly against any liability of accidental loosening. Furthermore, the pocket is marginally reinforced to resist bending strains which will save the pane from being broken or damaged.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is an outside face view of a window structure embodying the invention.

Fig. 2 is a view similar to Fig. 1 but showing the flap portion of the window open to permit access to the pane.

Fig. 3 is a view of the reinforcement used in connection with the structure of Fig. 1.

Fig. 4 is a rear face view of the structure shown in Fig. 1.

Fig. 5 is a detail view of a portion of the structure of Fig. 1 and associated figures.

Fig. 6 is a section on the line 6—6 of Fig. 1 but drawn on a larger scale.

Fig. 7 is a face view of another form of window from that shown in Fig. 1.

Fig. 8 is a detail view of a stiffening member used in the structure shown in Fig. 7.

Referring to the drawings, there is shown a small portion of a curtain 1 which may be taken as illustrating the rear curtain of an automobile top, or as illustrating any flexible curtain of any type of vehicle in which a window is provided in the curtain.

It is customary to provide the curtains with windows of different shapes, a prevalent shape being oval, and in the structure of Fig. 1 and associated figures, it is assumed that the window is an oval window without, however, limiting the invention to such particular shape of window. Moreover, there is shown a window pane 2 in Fig. 1 and associated figures, such window pane being either of celluloid or glass in accordance with prevailing custom.

Through the curtain 1 there is produced an opening 3 corresponding in shape to that of the window pane 2. In order to stiffen the marginal portions of the opening 3 it may be provided with several layers 4 of fabric held to the main body of the curtain by rows of stitching 5, 6.

There is also provided a frame 7 made up of a suitable number of thicknesses of fabric, preferably such as is used for the curtain 1. The fabric of the frame 7 is held together by rows of stitching 8 and certain portions of this stitching shown at 8$^a$ may be utilized to fasten the frame to the curtain about the part of the opening 3, such part including less than the circumferential extent of the frame and serving as a hinge for the latter. The inner margin of the frame 7 is formed with a hem 9 in which is lodged a rod 10, which rod may be made of stout wire bent into oval shape in accordance with the oval form of the window in the structure of Fig. 1 and associated figures, so that the inner margin of the frame is appropriately stiffened. The rod lodged in the hem forms a raised border or margin for the pane and is not only ornamental but serves as a protection for the pane.

About that portion of the frame 7 which is not fastened to the curtain is a strip 11 of sufficiently stiff material, such as leather or the like, providing a pocket between it and the frame 7 for the purpose of receiving a corresponding portion of the edge of the pane 2. The entrance to the pocket is at the top so that the frame must be swung to the position shown in Fig. 2 in order to insert or remove the pane.

The strip 11 is pierced by and forms a holding means for a series of receptacles 12 designed to receive buttons 13 which are made fast to the curtain 1 in the reinforced portion about the opening 3, the receptacles 12 and buttons 13 constituting snap buttons which may be of familiar form. Such snap buttons will hold together against distorting forces and yet may be readily separated and united at will. The snap buttons occupy a sufficient portion of the circumferential extent of the window frame and curtain about the opening 3 to hold the parts firmly together with a window pane installed and when the buttons are pulled apart there is sufficient free opening to permit the withdrawal of the window pane or the insertion of another one.

When the frame 7 is fastened in place with a window pane lodged therein the pane is surrounded entirely about its edge, thus firmly holding it against any possibility of working loose. Part of the peripheral edge of the pane is within the pocket and part is outside thereof, the part outside extending between the frame and curtain below the point of attachment of the former to the latter. If from any cause the window pane becomes broken, the broken parts may be readily removed by disconnecting the snap buttons, and raising the frame to the position shown in Fig. 2 so as to expose the top of the pocket, or if it be desired to clean the window the same procedure will free the window pane for removal, for cleansing and for replacing.

The rod 10, which may be quite stiff, protects the window pane against bending forces which, in the case of a glass pane, would shatter it and in the case of a celluloid pane might crease or break it. With a celluloid pane the stiffening rod is advantageous since it prevents creasings that are difficult to remove and oftentimes the appearance of the celluloid is marred by such creasings.

In Fig. 7 there is shown a rectangular frame 14 which may be quite similar in construction to the frame 7 of Fig. 1 and associated figures. The window in Fig. 7 is provided with a rectangular pane 15 and a rectangular shaped reinforcing rod 16 which latter is shown separately in Fig. 8. The frame 14 is hinged to the curtain 1 by a row 17 of stitching along one edge of the frame while along the other edges of the frame are snap buttons 18 which may be of like construction to the snap buttons 12, 13 of the structure of Fig. 1. It will be understood that the frames and window panes may be made of other shapes than those indicated without interfering with the facility with which the panes may be moved and replaced.

By making the permanent fastening of the window frame at the top thereof and the separable portion of the window frame at the bottom thereof the window will readily shed water in the case of a storm. Since the window panes are held in place in a relatively loose manner any rain striking the window panes naturally gravitates to the bottom thereof and will find its way back of the frame. For this reason the inner face of the pane retaining pocket along the lower margin of the frame is provided with perforations 19 allowing water to escape therethrough so as to flow down the outside of the curtain where it will do no harm. Of course, the drainage holes or perforations 19 will serve the same purpose if they are on the outside of the window frame but by placing them on the inside of the window frame they are out of sight and hence not noticeable, while at the same time they are equally efficient as drainage perforations.

What is claimed is:—

1. The combination with a curtain having an opening therethrough, of a window frame about the opening and formed with a marginal pocket for receiving the edge portion of a light transmitting pane and less extensive circumferentially than the frame, and a flexible connection between the frame and curtain along that portion of the frame opposite the pocket.

2. The combination with a curtain having an opening therethrough, of a window frame about the opening and formed with a marginal pocket for receiving the edge portion of a light transmitting pane and less extensive circumferentially than the frame, and a flexible connection between the frame and curtain along that portion of the frame opposite the pocket, said frame and curtain along the pocket portion of the frame being provided with coacting fastening means.

3. The combination with a curtain having an opening therethrough, of a window frame placed about the opening and formed with a pocket to receive a light transmitting pane, said pocket having its entrance at the top, means for flexibly and permanently fastening the upper portion of the frame to the curtain, and means for removably fastening the remaining portion of the frame to the curtain whereby upon the separation of the fastening means, the frame may be raised to expose the pocket for the removal or the reception of a pane.

4. The combination with a flexible curtain having an opening therethrough, of a window frame formed of layers of fabric stitched together and stitched along a portion of its outer edge to the curtain, thereby forming a flexible hinge connection between the frame and the curtain, means for detachably connecting said frame along the remainder of its outer edge to the curtain, said frame having means for receiving and inclosing the peripheral edge of a window pane, and stiffening means embedded in the window frame about the inner margin thereof, said stiffening means being substantially the same shape as the pane, and being carried by the frame as the latter is turned on its hinge.

5. The combination with a flexible curtain having an opening therethrough, of a window frame fastened to the curtain about the opening, and having a transparent pane mounted therein, with the extent of the fastening means of the frame to the curtain along the latter, less than the peripheral length of the frame to constitute a hinge, separable fastening means for holding the portion of the window frame other than the hinged portion to the curtain, and a rod or wire embedded in the frame about the inner edge portion thereof and independent of and spaced from the said fastening means and serving to stiffen the frame as well as provide a raised margin for the pane, whereby to prevent injury to said pane, said rod or wire being substantially of the same shape as the pane, and being carried by the frame as the latter is turned on its hinge.

6. The combination with a curtain having an opening therethrough, of a window frame for the opening provided with a pane-receiving pocket about the lower marginal portion of the frame, said pocket having passages for the escape of water which may run down the pane and reach the pocket.

7. The combination with a curtain having an opening therethrough, of a window frame for the opening provided with a pane-receiving pocket about the lower marginal portion of the frame, said pocket having passages for the escape of water which may run down the pane and reach the pocket, said frame and curtain having coacting fastening means about that portion of the frame and opening provided with the passages, and said passages being located on the inner side of the frame.

8. The combination with a flexible curtain having an opening therethrough, of a window frame of flexible material surrounding the opening and adapted to receive a transparent pane, a connection between the upper portion of the frame and the curtain to constitute a hinge for the frame, separable coacting fastening means between the frame and curtain about that portion of the frame and opening other than that occupied by the hinge connection, and a pocket formed in the frame at the lower portion thereof to receive the corresponding portion of the transparent pane.

9. The combination with a flexible curtain having an opening therethrough, of a window frame of flexible material surrounding the opening and adapted to receive a transparent pane, a relatively permanent connection between the upper portion of the frame and the curtain to constitute a hinge for the frame, fastening means between the frame and curtain about that portion of the frame and opening other than that occupied by the hinge connection, a strip of stiff material fastened to that portion of the frame which is not permanently connected to the curtain, said strip forming a pocket between it and the frame, said pocket being open at the top, and a transparent pane partially seated in the pocket and partially projecting from the opening at the top of the pocket and lying between the frame and curtain below the said permanent connection.

10. The combination with a flexible curtain having an opening therethrough, of a window frame of flexible material surrounding the opening and adapted to receive a transparent pane, a permanent connection between the upper portion of the frame and the curtain to constitute a hinge for the frame, separable fastening means between the frame and curtain about that portion of the frame and opening other than that occupied by the hinge connection, and a pocket formed in the frame at the lower portion thereof to receive the corresponding portion of the transparent pane, said pocket being open at the top of the frame, the frame also being provided with a reinforcing rod which is seated in a hem about the inner edge portion of the frame, said rod being of substantially the same shape as the pane and forming a raised border for the pane.

In testimony that I claim the foregoing as my own I have hereto affixed my signature.

JOHN MARTIN SIMMONS.

Witnesses:
VERA M. CRAIN,
W. H. DAVISON.